(12) United States Patent
Strat et al.

(10) Patent No.: US 7,825,775 B2
(45) Date of Patent: Nov. 2, 2010

(54) ANTENNA-BASED TRIGGER

(75) Inventors: Daniella Strat, Sound Beach, NY (US); Mark Duron, East Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 444 days.

(21) Appl. No.: 11/830,921

(22) Filed: Jul. 31, 2007

(65) Prior Publication Data

US 2009/0033455 A1  Feb. 5, 2009

(51) Int. Cl.
*H04Q 5/22* (2006.01)
(52) U.S. Cl. .................. 340/10.5; 340/572.1; 340/10.1
(58) Field of Classification Search .............. 340/572.1, 340/10.1, 505, 447
See application file for complete search history.

(56) References Cited

U.S. PATENT DOCUMENTS

| | | | |
|---|---|---|---|
| 7,113,087 | B1 | 9/2006 | Casebolt et al. |
| 2003/0210203 | A1 | 11/2003 | Phillips et al. |
| 2003/0228891 | A1* | 12/2003 | Kobayashi et al. ....... 455/575.5 |
| 2005/0227633 | A1* | 10/2005 | Dunko ...................... 455/90.3 |
| 2006/0183431 | A1 | 8/2006 | Chang et al. |

FOREIGN PATENT DOCUMENTS

| | | |
|---|---|---|
| EP | 1 298 810 | 4/2003 |
| EP | 1298810 A2 * | 4/2003 |
| EP | 1 583 250 | 10/2005 |
| EP | 1 655 850 | 5/2006 |
| EP | 1655850 A1 * | 5/2006 |
| WO | 2009017947 | 2/2009 |

OTHER PUBLICATIONS

International Preliminary Report on Patentability dated Feb. 11, 2010 in related case PCT/US2008/069617.

* cited by examiner

*Primary Examiner*—Travis R Hunnings

(57) ABSTRACT

Described is a device including a processor, a wireless arrangement including an antenna, and a memory arrangement storing first data and second data. The first data includes predetermined antenna characteristics and the second data includes predetermined triggering characteristics for triggering a function of the device. When third data fails to match the first data, the processor compares the third data to the second data, the third data being indicative of characteristics changes of the antenna. The processor triggers a corresponding function of the device as a function of the third data and the second data.

16 Claims, 6 Drawing Sheets

ANTENNA-BASED TRIGGER

FIELD OF INVENTION

The present application generally relates to trigger arrangements for activating an electronic device.

BACKGROUND INFORMATION

Electronic devices often utilize trigger arrangements for triggering functions of the devices. The trigger arrangements generally comprise a mechanical trigger that is engaged by a user. For instance, handheld devices may include a gun-style trigger that is pulled with a finger. Other types of triggers include push buttons and switches. Regardless of the type of trigger used, the trigger requires additional hardware to implement. This increases manufacturing costs and requires allocation of additional space in a device's physical design. In addition, movable triggers are subject to wear and breakage resulting from repeated use.

SUMMARY OF THE INVENTION

The present invention relates to a device including a processor, a wireless arrangement including an antenna, and a memory arrangement storing first data and second data. The first data includes predetermined antenna characteristics and the second data includes predetermined triggering characteristics for triggering a function of the device. When third data fails to match the first data, the processor compares the third data to the second data, the third data being indicative of characteristics changes of the antenna. The processor triggers a corresponding function of the device as a function of the third data and the second data.

The present invention also relates to a method including the step of storing first data and second data in a memory arrangement of a device including an antenna and a processor, the first data including predetermined characteristics of the antenna, the second data including predetermined triggering characteristics for triggering a function of the device. The method also includes the step of comparing the first data to third data, wherein when the third data fails to match the first data, the processor compares the third data to the second data, the third data being indicative of characteristics changes of the antenna. The method also includes the step of triggering a corresponding function of the device when the third data matches the second data.

The present invention also relates to a device including a processing means, a wireless arrangement including a wireless signal sensing means, and a storage means storing first data and second data, the first data including predetermined sensing means characteristics, the second data including predetermined triggering characteristics for triggering a function of the device. When third data fails to match the first data, the processing means compares the third data to the second data, the third data being indicative of characteristics changes of the sensing means. The processor triggers a corresponding function of the device as a function of the third data and the second data.

DETAILED DESCRIPTION

Figure 1:
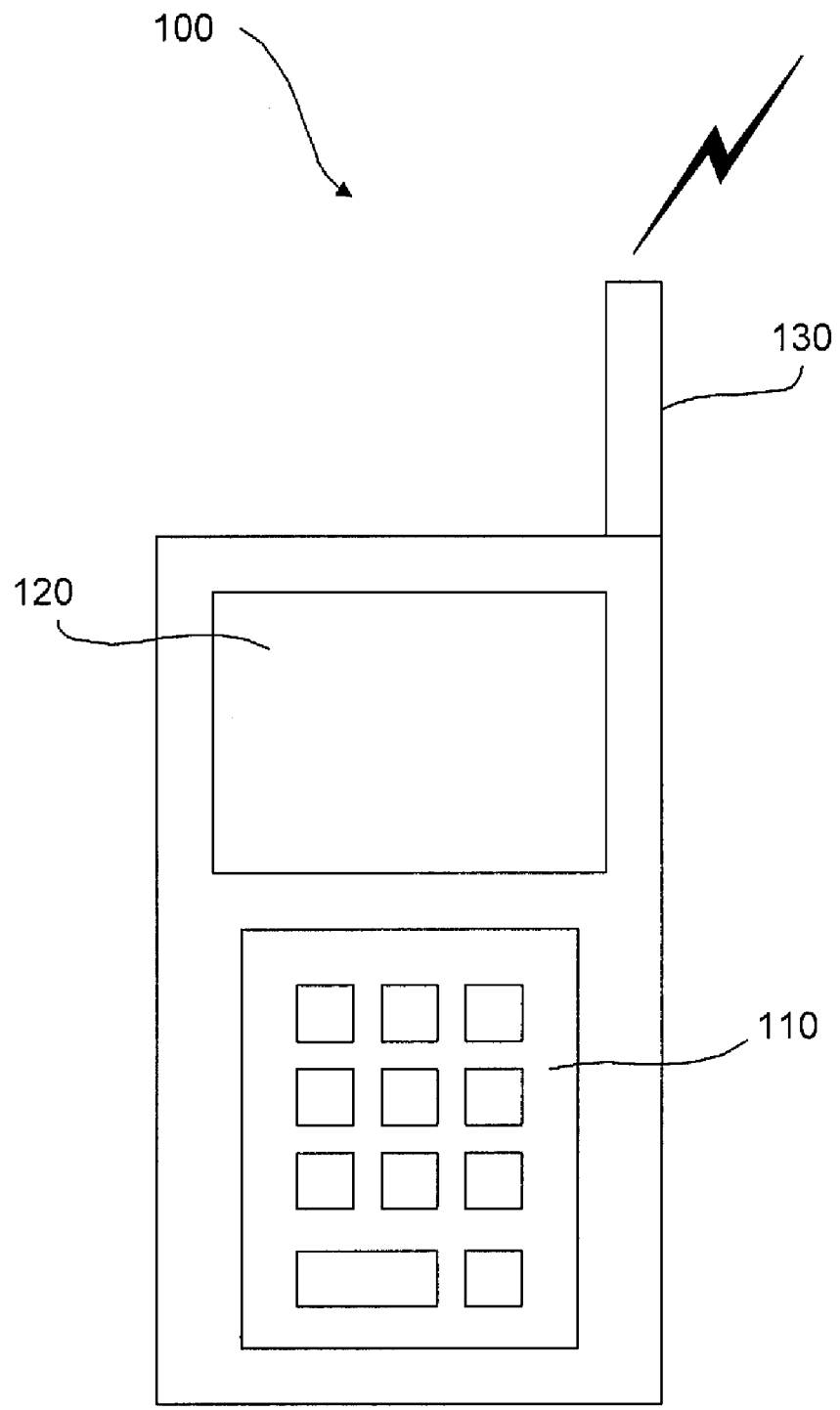
FIG. 1 shows an exemplary embodiment of a mobile device according to the present invention.

The present invention may be further understood with reference to the following description and the appended drawings, wherein like elements are provided with the same reference numerals. The present invention relates to triggering arrangements for electronic devices. Various embodiments of the present invention will be described with reference to a radio-frequency identification ("RFID") reader. However, those skilled in the art will understand that the present invention may be implemented with any electronic device that utilizes a wireless arrangement. For example, other electronic devices may include cell phones, PDAs, wireless headsets, media players, wireless routers, global position system devices, mobile computers, Bluetooth radios, televisions, walkie-talkies, etc.

FIG. 1 shows an exemplary embodiment of an electronic device (e.g., a mobile device 100) according to the present invention. The device may include a display 120, such as an LCD or a touch screen. The device 100 may also include an input arrangement 110, such as a keypad, a keyboard, a touch-sensitive interface, etc.

As shown in FIG. 1, the device 100 may further include a wireless arrangement comprising an antenna 130. The antenna 130 may be an external antenna (e.g., a retractable antenna or a stub). However, in other embodiments the antenna 130 may be located within a housing of the device 100 (e.g., an internal antenna). The antenna 130 may be any type of antenna such as a dipole, a monopole, a parabolic reflector, etc. The antenna 130 may enable transmission and/or reception of wireless signals between the device 100 and another device. For example, in an exemplary embodiment the antenna 130 may be an RFID antenna that enables the device 100 to read data from an RFID tag. However, in other embodiments the antenna 130 may enable communication of data in other types of protocols or formats (e.g., 802.11x, 802.16, Wi-Max, Bluetooth, VHF signals, AM/FM signals, etc.).

Figure 2:
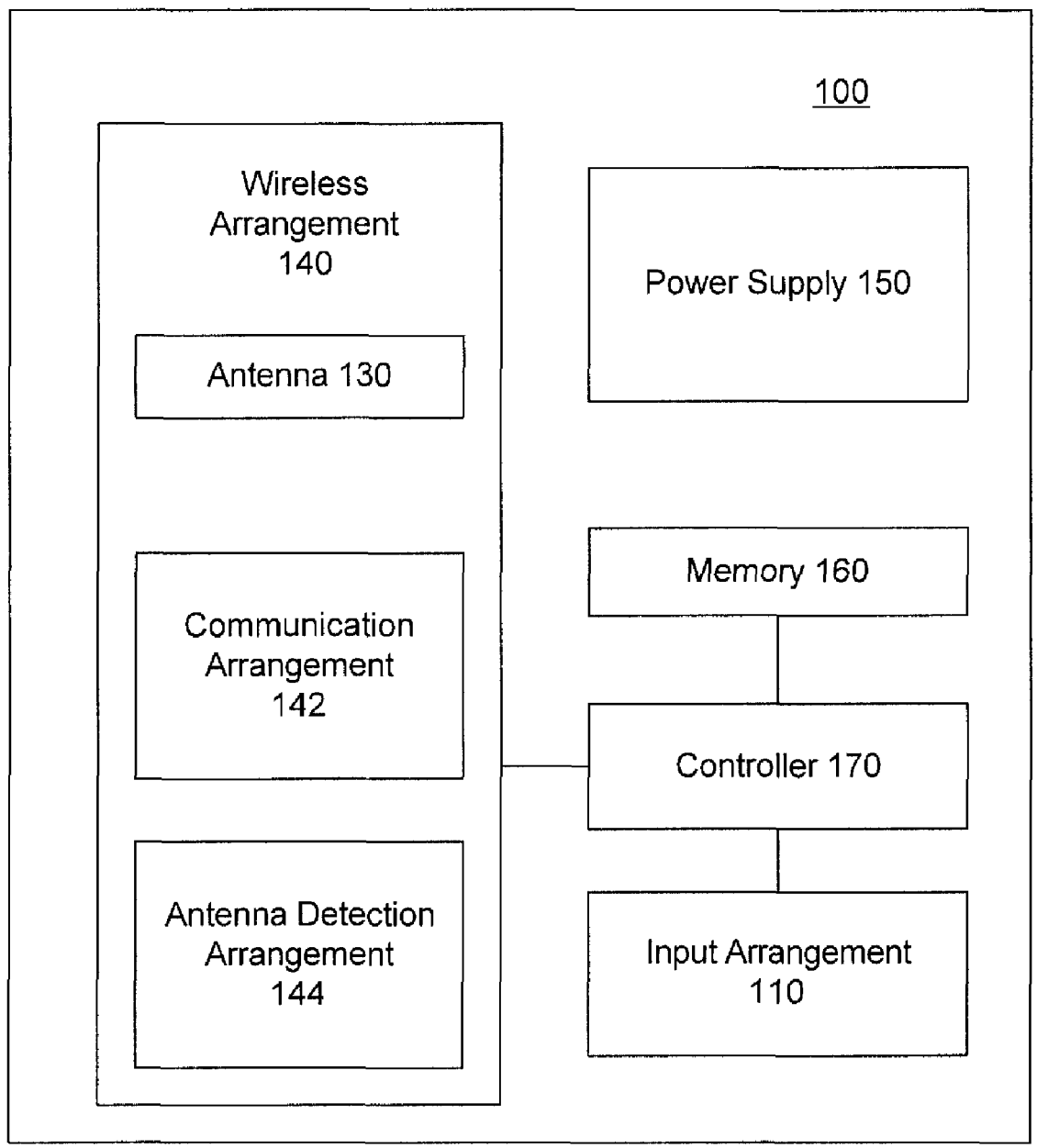
FIG. 2 shows a block diagram of an exemplary embodiment of the mobile device of FIG. 1.

FIG. 2 shows a block diagram of an exemplary embodiment of the device 100. As shown in FIG. 2, the device 100 may include a wireless arrangement 140 comprising the antenna 130, a communication arrangement 142 and an antenna detection arrangement ("ADA") 144. The device 100 may also include the input arrangement 110, a power supply 150, a memory 160 and a controller 170.

The communication arrangement 142 may enable wireless communication by transmitting and receiving wireless signals via the antenna 130. The communication arrangement 142 may include any combination of hardware and/or software necessary for processing the wireless signals. For example, the communication arrangement 142 may include a digital signal processor, a transmit buffer, a receive buffer, and a wireless controller. The communication arrangement 142 may format outbound data into an appropriate format (e.g., 802.11 g) as well as convert incoming data into a format that can be interpreted by the controller 170 (e.g., decoding and/or decrypting data).

The ADA 144 may include any combination of hardware and/or software necessary for detecting wireless characteristics of the antenna 130. The wireless characteristics may include any number of factors indicative of the antenna's 130 ability to transmit and/or receive wireless signals. For example, the wireless characteristics may include data that enables the device 100 to determine an impedance of the antenna 130. As will be discussed in detail below, changes in the impedance may be detected and utilized for triggering a function of the device 100.

The power supply 150 may be any power source such as an AC-to-DC adaptor, a rechargeable battery, a non-rechargeable battery, a solar cell, etc. The power supply 150 may provide power to any of the components of the device 100, including the memory 160, the controller 170 and the wireless arrangement 140.

The memory 160 may comprise any type of readable and/or writeable storage device, such as a hard drive, a recordable medium (e.g., a compact disc or a flash card), a physical memory (e.g., RAM, EPROM or Flash memory), etc. The memory 160 may contain data required for operation of the device 100. For example, as will be discussed in further detail below, the memory 160 may include one or more base profiles and one or more user profiles, each of which may correspond to predetermined or user determined antenna characteristics (e.g., the wireless characteristics). In addition, the memory 160 may include operating system and/or application program data.

The controller 170 controls operation of the device 100 and may comprise any type of control circuit known in the art, including a microprocessor, an application-specific integrated circuit, an embedded controller, etc. The controller 170 may be communicatively coupled to the memory 160, the input arrangement 110 and the wireless arrangement 140. The controller 170 may send and receive data to/from each of these components in accordance with the operation of the device 100. The controlling of the device 100 will be described in further detail below.

Exemplary embodiments of ADAs will now be described with reference to FIGS. 3 and 4. The exemplary ADAs will be discussed with reference to the detection of impedance changes in the antenna 130. However, those skilled in the art will understand that other types of antenna characteristics may also be utilized.

An impedance of the antenna 130 may be changed by, for example, placing a portion of the user's body (e.g. a finger) within proximity of the antenna 130. In one embodiment, the user may grasp the antenna 130 between a thumb and a forefinger. As will be discussed in detail below, changes in the impedance may be detected and used to trigger a function of the device 100. Thus, user interaction may constitute user input that causes triggering.

If the antenna 130 is the internal antenna, the user interaction may not involve actual contact with the antenna 130. Instead, the user may interact with the housing of the device 100. For example, the user may bring the finger into proximity or in contact with a portion of the housing that is adjacent or proximal to the antenna 130. In this manner, the impedance of the antenna 130 is changed even though the user has not directly interacted with the antenna 130.

Figure 3:
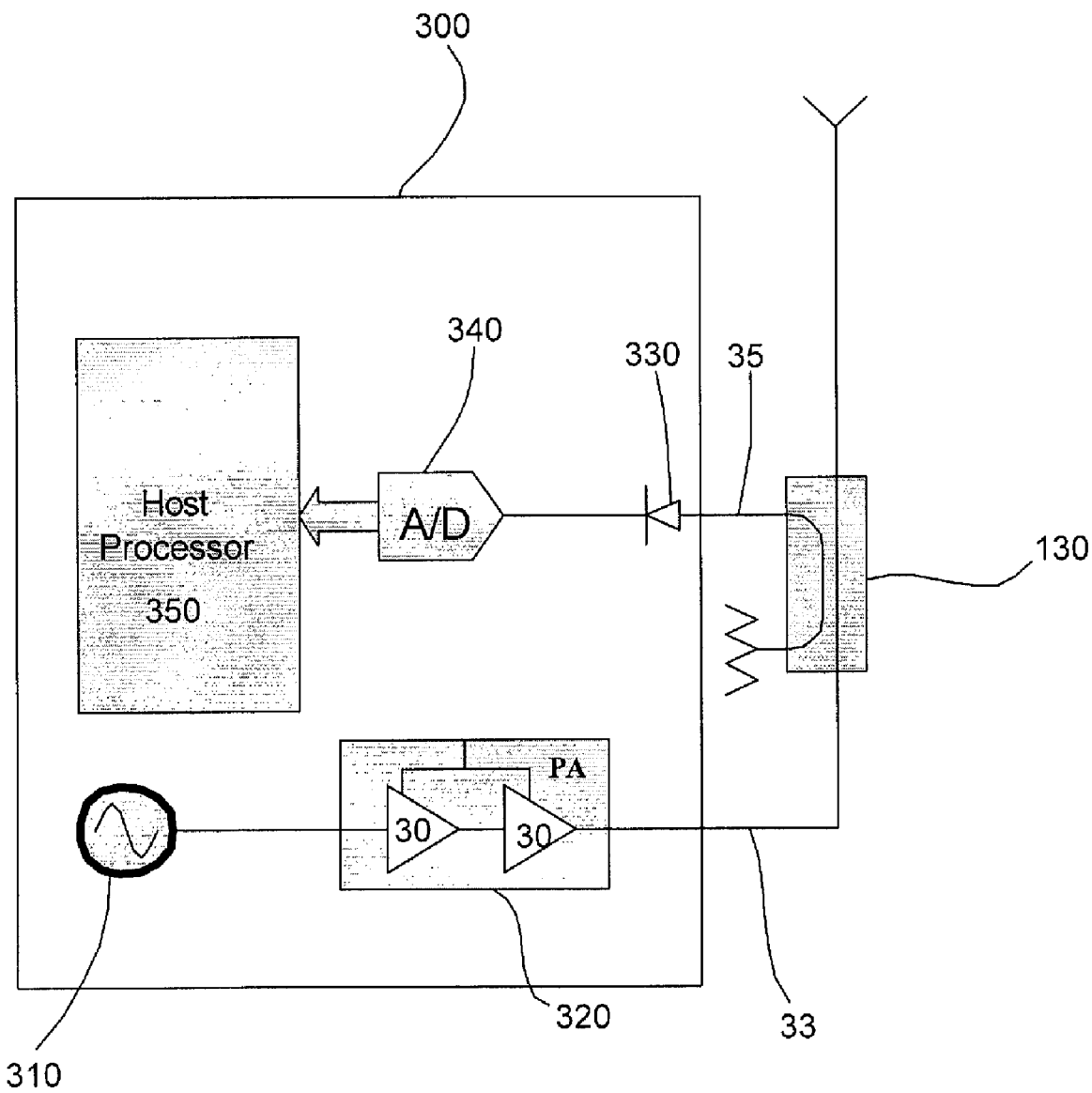
FIG. 3 shows an exemplary embodiment of an antenna detection arrangement according to the present invention.

FIG. 3 shows an exemplary embodiment of an ADA 300, which may include a signal generator 310, a power amplifier ("PA") 320, an analog-to-digital ("A/D") convertor 340 and a host processor 350. The signal generator 310 may be an alternating current ("AC") source outputting a constant-frequency signal to the PA 320. The output of the signal generator 310 may comprise a carrier signal which is amplified by the PA 320 and which can be modulated with a signal and subsequently transmitted by the antenna 130.

The PA 320 may include one or more amplifying components 30 in series with each other. For example, the amplifying components 30 may be any analog or digital component that receives an input and produces a higher voltage output, such as an operational amplifier, a differential amplifier, a transistor amplifier, etc. Thus, an output of the PA 320 may be an amplified version of the carrier signal. The PA output may be applied to the antenna 130 via a feed line 33.

The antenna 130 may be viewed as a transmission line with a known or measurable base impedance (e.g., a characteristic impedance). When the antenna 130 operates free of interference such as physical contact with the object, an impedance of the antenna 130 may remain unchanged (e.g., the impedance is approximately equal to the base impedance). However, if the antenna is interrupted (e.g., by bringing the object into contact with, or within close proximity to, the antenna 130), the impedance may change. Changes in the impedance may be detected using demodulation. For example, the ADA 300 may comprise an envelope detector that samples a reverse power reflected back from the antenna 130 to a driving source (e.g., the signal generator 310). The envelope detector may include a diode 330 attached to a tap line 35 of the antenna 130. Output of the diode 330 may be received by the A/D converter 340, which may be coupled to the host processor 350.

The host processor 350 may be any processing device such as a microprocessor, an embedded controller, an application-specific integrated circuit, etc. The processor 350 may receive a digital output of the A/D convertor 340. As will be described in detail below, the processor 350 may compare the digital output to stored antenna characteristics to determine whether triggering should occur. For example, the processor 350 may compare the digital output to stored threshold values.

Figure 4:
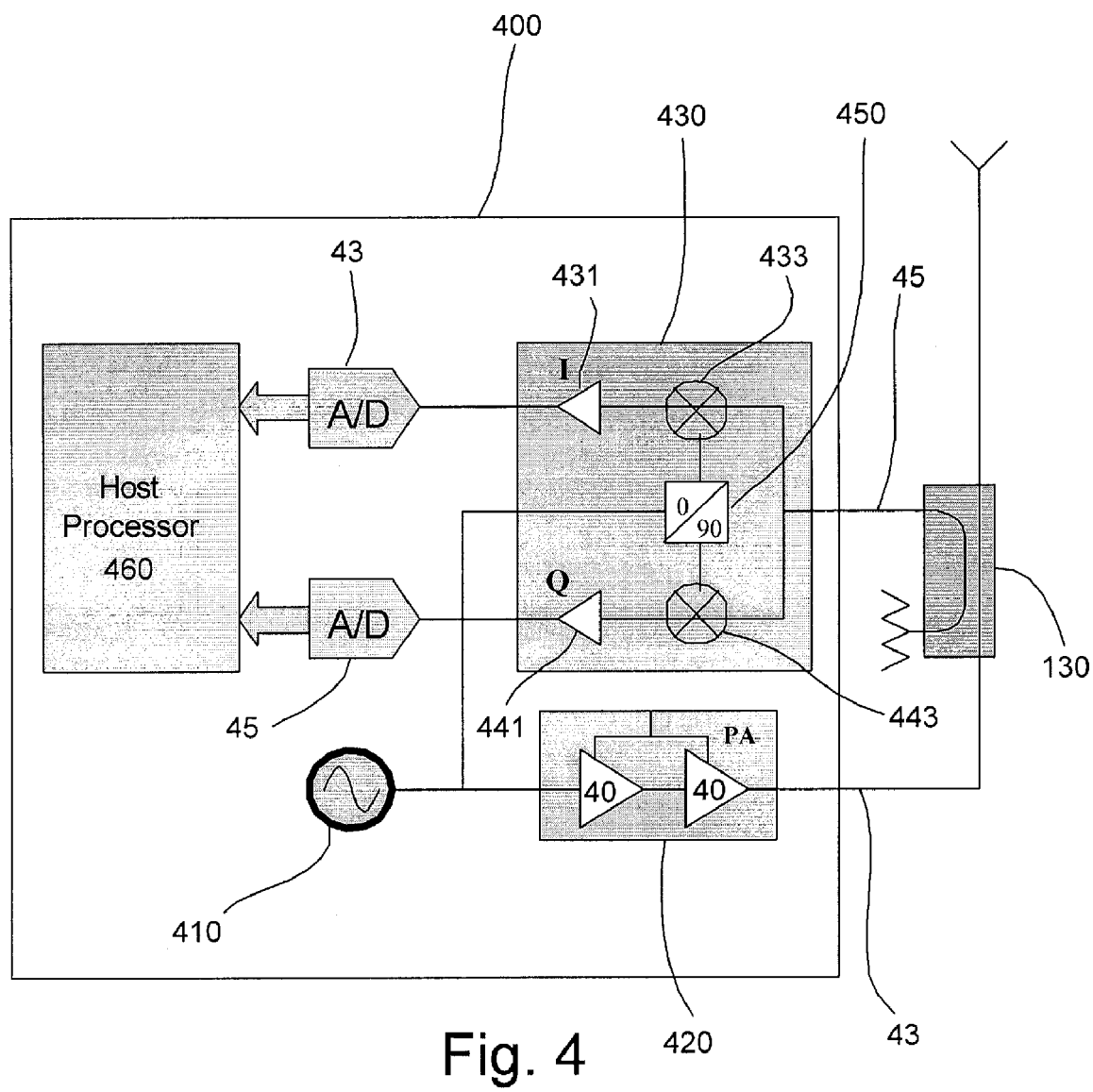
FIG. 4 shows another exemplary embodiment of an antenna detection arrangement according to the present invention.

FIG. 4 shows an exemplary embodiment of an ADA 400, which may include a signal generator 410, a PA 420, a vector demodulator 430, two or more A/D converters 43 and 45, and a host processor 460. Similar to the ADA 300 described with reference to FIG. 3, the ADA 400 may detect changes in the impedance of the antenna 130. The ADA 400 may comprise a demodulator that demodulates two or more components (e.g., vector components) of a reflected signal.

The signal generator 410 may produce an AC signal, which may be amplified by one or more amplifying components 40 of the PA 420. Output of the PA 420 may then be inputted into the antenna 130 via a feed line 43.

The reflected signal may be received by the vector demodulator 430 via a tap line 45. The vector demodulator 430 may separate the reflected signal into two or more components using a phase generator 450 and a plurality of mixers 433 and 443. The output of each mixer 433, 443 may be respectively received by buffers 431 and 441. Each buffer 431 and 441 may produce an output comprising a separate output channel (e.g., an "I channel" and a "Q channel") of the vector demodulator 430. The channel outputs may differ in phase as a function of outputs produced by the phase generator 450. For example, the phase generator 450 may sample the carrier signal of the signal generator 410 and derive inputs of the mixers 433, 443 that are ninety degrees out of phase relative to each other. In this manner, the vector components of the reflected signal may be separated.

A degree with which the impedance matches the base impedance may be inversely proportional to a vector sum of values outputted by the I and Q channels. This vector information may represent a reflection coefficient of the antenna, which may vary in response to changes in antenna tuning or changes in an environment that the antenna has illuminated with RF energy. Those skilled in the art will understand that a magnitude of the reflection coefficient change may be proportional to a coupling factor of the change experienced by the antenna 130. That is, the closer to the antenna the object becomes, the greater a potential change that the reflected signal can cause. This change may be detected primarily when the object is located within a near field of the antenna 130. If the object is located beyond the near field, changes to the reflection coefficient as a result of the presence of the object may be negligible. A magnitude of the change in the output of the I and Q channels may indicate whether the user is interacting with the antenna 130. For example, two-dimensional threshold values may indicate values associated with the finger touching the antenna 130.

In addition to indicating whether the user is interacting with the antenna 130, the I and Q channel outputs may indicate a location along the antenna 130 at which the interaction is occurring. This may be indicated by comparing a phase relationship between the I and Q channel outputs. Thus, the ADA 400 may distinguish between a plurality of potential interaction locations such as along a proximal, a middle, or a distal portion of the antenna 130. The host processor 460 may determine whether the interaction is occurring and the location of the interaction.

Figure 5:
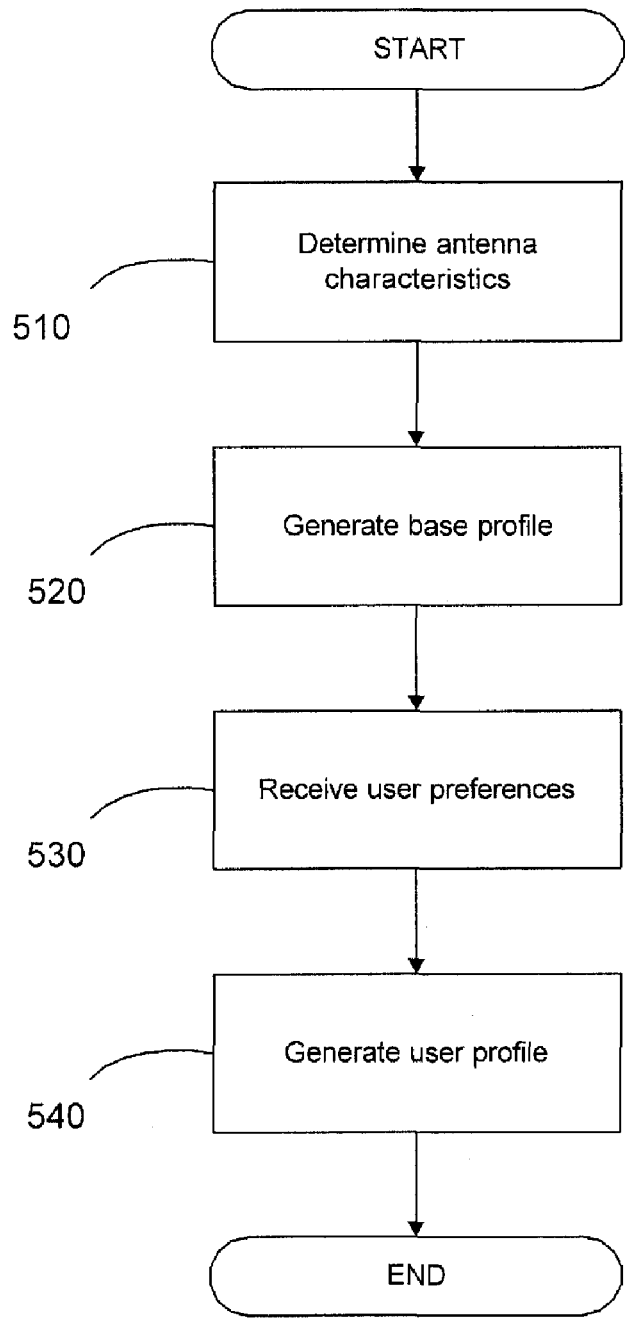
FIG. 5 shows an exemplary method for generating a user profile according to the present invention.

FIG. 5 shows an exemplary embodiment of a method 500 according to the present invention. The method 500 may be implemented on the device 100, in any combination of hardware and/or software. Performance of the method 500 may occur anytime (e.g., during device manufacturing, during an initial setup, after beginning to operate the device 100, etc.). In step 510, the device 100 determines characteristics of the antenna 130 using the ADA 144, which may be an envelope detector (e.g., the ADA 300) or a vector demodulator (e.g., the ADA 400). The antenna characteristics are indicative of an output of the antenna 130 (e.g., the impedance) generated in response to one or more inputs and/or antenna variables (e.g., input power, input frequency, antenna geometry, etc.). The antenna characteristics may be predetermined (e.g., a known characteristic impedance) or determined experimentally by measuring signal reflections of the antenna 130. For example, if the ADA 144 is the envelope detector, a magnitude of a reflected signal may be measured. Alternatively, if the ADA 144 is the vector demodulator, both a magnitude and a phase of two or more vector components of a reflected signal may be measured.

In some embodiments, the device 100 may calculate the antenna characteristics in addition, or in alternative to, measuring the antenna characteristics experimentally. For example, the antenna characteristics may be calculated in accordance with predetermined equations and/or known data values (e.g., antenna geometry, operating frequency, power, etc.). After determination, the antenna characteristics may be stored for future use (e.g., in the memory 160), as will be explained below.

In step 520, the device 100 generates a base profile as a function of the antenna characteristics. For example, the base profile may include a two-dimensional plot of the electric field and/or the magnetic field as a function of spatial position for various locations along the antenna. In some embodiments, an entire base impedance (e.g., a two-dimensional representation of the base impedance) may be reconstructed using antenna vector impedance characteristics. The base profile may correspond to one or more predetermined operating parameters such as frequency or operating power. The base profile may also correspond to either the base impedance, or any other impedance that is substantially free of user interaction. Thus, the base profile is a representation of the antenna characteristics when the antenna 130 is operating under normal conditions. The base profile may be stored in the memory 160 for comparison to future antenna measurements, as will be explained below.

In step 530, the device 100 receives user preferences, which may include triggering preferences. For example, the user may specify a location along the antenna 130 (e.g., the proximal end) and may further specify a function that will be triggered if the user interacts with the specified location (e.g., bringing fingers into proximity or in contact with the specified location). The user preferences may also include triggering sensitivity. For example, the user may specify whether merely bringing the fingers into proximity is sufficient to cause triggering, or whether actual touching is required. The user may also specify a duration requirement, such as bringing the fingers into proximity for at least one second before triggering occurs.

The user preferences may correspond to specific interruption patterns. For example, a pattern corresponding to a touching of the proximal end may differ from a pattern corresponding to a touching of the distal end. This difference may include differences with respect to any antenna characteristic, such as impedance, electric/magnetic field strength, radiation intensity, etc. Thus, each specific pattern may be unique to a particular antenna location and/or finger position. The specific patterns may be experimentally determined by having the user interact with the device 100 (e.g., during a training session) or may be predetermined based on pattern predictions. The specific patterns may be stored in the memory 160 as predetermined characteristics, to later be used during a comparison to measured antenna characteristics.

In step 540, the device 100 generates a user profile based on the user preferences. The user profile may be associated with user information such as a user name, a password, user contact information, user authorization or permission information, etc. If the user profile is a preexisting profile, a new profile may not be necessary because the existing profile can be updated with any new user preferences. The user profile is then saved in the memory 160 and accessed if the user chooses to identify himself to the device 100 during future use. The device 100 is now fully initialized and ready for use in normal operations.

Figure 6:
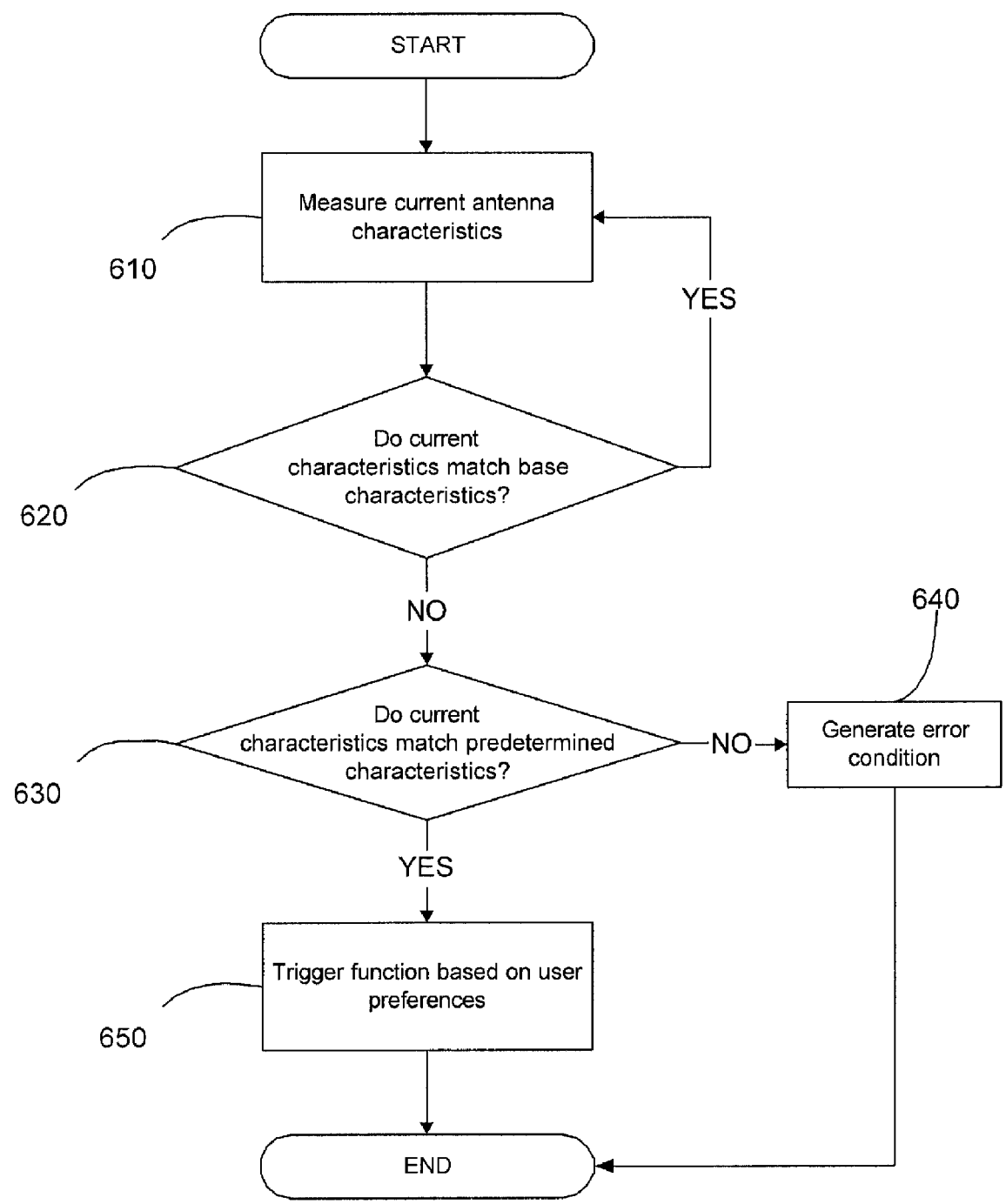
FIG. 6 shows an exemplary method for triggering a device according to the present invention.

FIG. 6 shows an exemplary embodiment of a method 600 according to the present invention. The method 600 may be performed during normal operations at anytime after the device 100 has been initialized by the method 500. In step 610, the device 100 measures current antenna characteristics. This measurement may be similar to that used in experimentally determining the antenna characteristics during step 510 of the method 500 (e.g., using the envelope detector or the vector demodulator).

In step 620, the device 100 determines whether the current characteristics match the base characteristics. The determination may be performed at the controller 170. However, in some embodiments, the determination may be performed by a dedicated processor such as the host processor 350 or the host processor 460. A matching procedure may involve performing a direct comparison of each current characteristic against each base characteristic of the same type (e.g., impedance). In this manner, the device 100 can evaluate whether the current characteristics are consistent with normal operations (e.g., when the user is not interacting with the device 100).

Accuracy of the matching procedure may be dependent on an error margin. If a difference between a base characteristic and a current characteristic is within the error margin, a match is found. However, if the difference is greater than the error margin, then a mismatch is determined. A wide error margin may allow for a higher degree of tolerance towards variations in the current characteristics. For example, different users may interact with the device 100 in a similar manner (e.g., touching the proximal end), yet may nevertheless produce very different interruption patterns. Even a single user may not consistently produce the same interrupted pattern each time. The error margin may either be user-selectable or fixed. If a match is found, the method 600 returns to step 610, where new measurements are taken.

In step 630, a match has not been found and the device 100 determines whether the current characteristics match the predetermined characteristics. For example, the device 100 may determine whether the impedance associated with the current characteristics is similar to any specific impedance stored in the memory 160. This step may also be performed on the controller 170 or the dedicated processor and may utilize a second error margin.

In step 640, a match has not been found, meaning that the current characteristics will not result in triggering.

Thus, an error condition is generated. The error condition may be as simple as ignoring the current characteristics and allowing the device 100 to detect new characteristics by repeating the method 600. Alternatively, in some embodiments the error condition may include an alert (e.g., a graphical or audio signal) that informs the user of the error, thereby allowing the user to reattempt interaction.

In step 650, a match is found and a function of device (e.g., RF pinging) is triggered in accordance with the user preferences. That is, if a function to be triggered may be specified by the user preferences as being associated with the current characteristics.

Based on the exemplary embodiments described above, it can be seen that the present invention provides substantial benefits to users of wireless devices. Triggering in accordance with the present invention does not require a separate trigger. By utilizing existing wireless hardware (e.g., the antenna 130) to perform trigger, manufacturing costs are reduced.

In addition, the present invention provides for flexible triggering. The user may specify what functions to trigger and/or how trigger should occur. For example, the user may specify tapping the proximal end to begin RF pinging, which may continue until the user taps the proximal end once more. In a multi-function device such as an RFID reader-barcode scanner combination, the user may select a first type of action (e.g., tapping the proximal end) for triggering an RFID function (e.g., toggling RF pinging) and select a second type of action (e.g., holding onto the proximal end) for triggering a barcode function (e.g., activating the barcode scanner). Thus, any number of triggering actions may be possible based on different user interactions with the same antenna. Those skilled in the art will understand that the present invention is not limited to RFID antennas, but may be implemented with any type of antenna, including antennas for local area network ("LAN") devices, wide area network ("WAN") devices, Bluetooth devices, etc.

The present invention has been described with reference to the above exemplary embodiments. One skilled in the art would understand that the present invention may also be successfully implemented if modified. For example, other embodiments of the present invention may utilize a form of triggering in which a first antenna plane is moved relative to a second antenna plane (e.g., a ground plane). If the antenna is formed of a soft, pliable material a portion of the antenna containing the first plane (e.g., a coil) may be moved relative to a portion of the antenna containing the second plane (e.g., a loop). Thus, other embodiments may utilize other forms of manual engaging (e.g., squeezing) in addition to those of touch and proximity engaging. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A device, comprising:
   a processor;
   a wireless arrangement including an antenna; and
   a memory arrangement storing first data and second data, the first data including predetermined antenna characteristics, the second data including predetermined triggering characteristics for triggering a function of the device;
   wherein when third data fails to match the first data, the processor compares the third data to the second data, the third data being indicative of characteristics changes of the antenna, and
   wherein the processor triggers a corresponding function of the device as a function of the third data and the second data; and
   wherein the third data is generated in response to a physical interaction with the antenna, and the physical interaction being one of a physical contact with the antenna by a foreign object and bringing the foreign object within proximity to the antenna, and wherein the foreign object is not part of the antenna.

2. The device of claim 1, wherein the predetermined antenna characteristics are indicative of an ability of the antenna to transmit wireless signals.

3. The device of claim 1, wherein the predetermined antenna characteristics are indicative of an ability of the antenna to receive wireless signals.

4. The device of claim 1, wherein the predetermined antenna characteristics include at least one of impedance, electric field strength, magnetic field strength and radiation intensity.

5. The device of claim 1, wherein the first data corresponds to a characteristic impedance of the antenna and the second data corresponds to a change in the characteristic impedance caused by a user interaction with the antenna.

6. The device of claim 1, wherein the third data is acquired by one of an envelope detector and a vector demodulator.

7. The device of claim 1, wherein the third data is acquired by measuring a reflected signal of the antenna.

8. The device of claim 1, wherein the second data comprises a user profile including at least one user-selected triggering characteristic.

9. The device of claim 1, wherein the triggering of the function occurs when the third data matches the second data within a predetermined error margin.

10. The device of claim 1, wherein the second data comprises a user profile including at least one user-selected triggering characteristic.

11. A method, comprising:
    storing first data and second data in a memory arrangement of a device including an antenna and a processor, the first data including predetermined characteristics of the antenna, the second data including predetermined triggering characteristics for triggering a function of the device;
    comparing the first data to third data, wherein when the third data fails to match the first data, the processor compares the third data to the second data, the third data being indicative of characteristics changes of the antenna;

triggering a corresponding function of the device when the third data matches the second data; and wherein the third data is generated in response to a physical interaction with the antenna, and the physical interaction being one of a physical contact with the antenna by a foreign object and bringing the foreign object within proximity to the antenna, and wherein the foreign object is not part of the antenna.

12. The method of claim 11, wherein the predetermined antenna characteristics are indicative of an ability of the antenna to transmit wireless signals.

13. The method of claim 11, wherein the predetermined antenna characteristics are indicative of an ability of the antenna to receive wireless signals.

14. The method of claim 11, wherein the predetermined antenna characteristics include at least one of impedance, electric field strength, magnetic field strength and radiation intensity.

15. The method of claim 11, wherein the first data corresponds to a characteristic impedance of the antenna and the second data corresponds to a change in the characteristic impedance caused by a user interaction with the antenna.

16. The method of claim 11, wherein the third data is acquired by one of an envelope detector and a vector demodulator.

\* \* \* \* \*

UNITED STATES PATENT AND TRADEMARK OFFICE
CERTIFICATE OF CORRECTION

PATENT NO. : 7,825,775 B2  Page 1 of 1
APPLICATION NO. : 11/830921
DATED : November 2, 2010
INVENTOR(S) : Strat et al.

It is certified that error appears in the above-identified patent and that said Letters Patent is hereby corrected as shown below:

In Column 7, Lines 21-27, delete "Thus, an error.................characteristics." and insert the same at Line 20, after "in triggering".

Signed and Sealed this
Seventh Day of August, 2012

David J. Kappos
*Director of the United States Patent and Trademark Office*